United States Patent Office 3,118,005
Patented Jan. 14, 1964

3,118,005
TITANIA CATALYZED DEHYDROFLUORINATION OF 1,1,1-DIFLUOROCHLORO ALKANES
Attila E. Pavlath, 1916 Napa Ave., Berkeley 7, Calif., and Francis H. Walker, 542 55th St., Oakland 9, Calif.
No Drawing. Filed Dec. 27, 1960, Ser. No. 78,226
2 Claims. (Cl. 260—653.5)

This invention relates to the dehydrohalogenation of a 1,1,1-difluorochloroalkane. More specifically, the present invention is accomplished by pyrolysis of a compound of the formula $CF_2Cl-CH-RR'$, wherein R and R' are selected from the group consisting of hydrocarbons containing up to three carbon atoms so long as the total number of carbon atoms in R and R' does not exceed four.

The prior art recognizes that the pyrolysis of such compounds, for example 1,1,1-difluorochloroethane, is known. Generally, the prior art employs much higher temperatures (600° C. to 1600° C.) in order to effect such dehydrohalogenation as opposed to the lower temperatures used in the present process.

The prior art also recognizes that when substantially pure aluminum fluoride is used as a catalyst, the pyrolysis can be effected at temperatures between 250° C. and 500° C. The present invention distinguishes over the last mentioned prior art in numerous ways. For example, different catalysts are used which in turn give higher conversion to the olefins than when substantially pure aluminum fluoride is used as a catalyst. Slightly lower temperatures may be used in the present invention to obtain the same percentage of conversion. Furthermore, by using the process of the present invention greater selectivity can be exercised in controlling the compounds produced.

U.S. Patent No. 2,478,933 issued to Bratton et al. on August 16, 1949, discloses the use of alumina as a catalyst in the dehydrofluorination of 1,1,1-difluorochloroethane. The present invention differs from the disclosure of this patent in that other catalysts are employed which are either effective to give higher conversions or are more selective in regard to the products produced.

The above and other objects and advantages of the present invention will appear from the following detailed description.

According to the present invention, $CF_2Cl-CH-RR'$, wherein R and R' are selected from the group consisting of hydrogen and hydrocarbons containing up to three carbon atoms provided the sum of the carbon atoms in R and R' does not exceed four, is passed over a catalyst in a reaction zone maintained at a temperature of at least 200° C. The particular reaction zone employed is held to be merely a matter of choice. The only requirements are that the material from which the reactor is made does not interfere with the desired reaction. A Monel tube has been found to be very satisfactory for the purposes of the present invention, but equivalent reactors of other materials are well recognized in the art and could be readily substituted.

The lower temperature limit employed in the present invention is 200° C. as mentioned previously. This is not an absolute lower temperature limit since some of the desired products are obtained at lower temperatures but the degree of conversion is not economically feasible.

Normally, the maximum temperature at which the present process will be run is approximately 500° C. However, by employing shorter retention times or contact times, the maximum economical temperature may be increased substantially and such is held to be within the scope of the present invention.

Next we come to the catalysts employed in the process of the present invention which is perhaps the crux of the present invention. The catalysts contemplated by the present invention include aluminum fluoride (on asbestos), ferric oxide, nickel oxide, activated charcoal, zinc oxide, titania, silica gel, silica-alumina and silver. Selection of the particular catalyst to be used depends upon the product or products desired and the particular operating conditions. Some of the catalysts mentioned supra result in the dehydrofluorination of the starting material, while others cause dehydrochlorination. Still other catalysts effect both and thus both olefins containing fluorine or fluorine and chlorine result as products. This will be clearly shown by the examples set forth hereinafter.

While the use of alumina and aluminum fluoride as catalysts in such a reaction to produce vinylidene chlorofluoride is known, the present invention shows a new and unexpected result when asbestos coated with aluminum fluoride is used as a catalyst. Contrary to what might be expected, vinylidene fluoride is predominately produced rather than vinylidene chlorofluoride when asbestos coated with aluminum fluoride is used as a catalyst and 1,1,1-difluorochloroethane is used as a starting material. It has also been discovered that catalysts such as ferric oxide, nickel oxide, activated charcoal, zinc oxide and silver give excellent conversions to a fluorine containing olefin such as vinylidene fluoride and 1,1-difluoropropylene when use in the pyrolysis reaction of the present invention.

On the other hand, titania, silica gel and silica-alumina compositions when used as catalysts result in mixtures of olefins containing fluorine alone and also containing both fluorine and chlorine. Further, as will be shown by the examples, titania and silica-alumina will also effect only the dehydrofluorination of the starting material under certain operating conditions. The selectivity of these catalysts is another feature of the present invention and here the products are controlled merely by controlling the operating conditions.

As far as could be determined, the catalysts employed in the present invention did not enter into the reaction but merely promoted the same. No aluminum compounds were found in the reaction products and the catalyst bed appeared unchanged.

It should be pointed out at this point that the present invention also includes mixtures of the aforementioned catalysts being used where varying percentages of the products, for example vinylidene fluoride and 1,1-fluorochloroethylene, are desired. For example, if it be desired to produce as an ultimate product a copolymer of 50% vinylidene fluoride and 50% 1-fluoro-1-chloroethylene, the catalyst employed in the present process would be a mixture of catalysts which effect dehydrochlorination and dehydrofluorination equally to produce a mixture of 50% vinylidene fluoride and 50% 1-fluoro-1-chloroethylene which would then be polymerized. The exact proportion of the catalyst mixture for a particular desired result would be easily determinable by experimentation which would be quite obvious to one skilled in the art.

The particular method of obtaining the coated asbestos catalyst does not form a part of the present invention and various methods of producing such catalyst would be obvious to one skilled in the art. For example, in making the coated asbestos catalyst, medium grade acid washed asbestos could be soaked in a saturated solution of sodium aluminum sulfate and water. The resulting slurry could then be filtered and most of the remaining water could be removed by washing the asbestos in acetone. The resulting sodium aluminum sulfate coated asbestos could then be soaked in a saturated solution of potassium fluoride, filtered and dried as before leaving asbestos coated with aluminum fluoride.

Further discussion of the present invention will be limited to effecting dehydrofluorination and/or dehydrochlorination of 1,1,1-difluorochloroethane for the sake of clarity. It should be kept in mind, however, that the following discussion is equally applicable to all starting materials falling under the general formula,

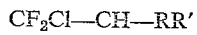

$CF_2Cl—CH—RR'$ as limited previously, which includes, for example, 1,1,1-difluorochloropentane, 1,1,1-difluorochloro-2-methylpentane, 1,1,1-difluorochloro-2-ethylbutane and the like.

In the more specific practice of the present invention, normally gaseous 1,1,1-difluorochloroethane for example is passed through a flow rate control device into a reactor which may be in the form of a Monel tube or the like. The reactor is packed with a catalyst or a mixture of catalysts from the group consisting of ferric oxide, nickel oxide, silver, activated charcoal, zinc oxide, titania, silica gel, silica-alumina, and aluminum fluoride coated asbestos depending on the product or products desired. The reactor is held at a temperature between 200 and approximately 500° C. and any conventional heating means may be used for this purpose. The reaction products are then collected and separated in any conventional manner. For example, the reaction products in the gaseous state may be first scrubbed of any acid formed by the dehydrohalogenation and the remaining vapors dried. The products are then condensed and may be separated by fractional distillation if so desired.

The size of the reactor and the flow rate of the 1,1,1-difluorochloroethane may vary widely. However, a retention time of from 6 to 150 seconds is preferred and the size of the reactor and the flow rate of the reactant should be controlled accordingly.

Examples of the present invention and comparative examples showing the use of prior art catalysts are as follows:

*Example I*

Difluoromonochloroethane was passed through a Monel tube 35 cm. by 2 cm. packed with Houdry grade 200 alumina. The tube was heated to 300° and the contact time was 30 seconds. The products were collected over water to remove hydrogen halide. The gas was then transferred to a gas-buret and analyzed by infrared spectroscopy and gas-liquid partition chromatography which indicated a 89.5% conversion to 1-fluoro-1-chloroethylene.

*Example II*

The reaction was repeated at 400° and a contact time of 30 seconds in the manner described in Example I. Gas chromatographic analysis showed a conversion of 91% to 1-fluoro-1-chloroethylene.

At 400° and a contact time of 6 seconds a conversion of 88.6% to 1-fluoro-1-chloroethylene was obtained.

The Monel tube was cooled, the alumina was removed and the tube was cleaned. Difluoromonochloroethane was passed through the tube in the absence of catalyst at 500° and a 30 second contact time. Analysis of the products by gas chromatography showed a 6.0% conversion to vinylidene fluoride. The conversion to 1-fluoro-1-chloroethylene was less than 0.5%. The rest was unreacted starting material.

*Example III*

The Monel tube was packed with Houdry Grade 200 hard alumina of surface area 180 to 210 m.²/gram. Anhydrous hydrogen fluoride was passed over the catalyst so that the surface was covered with aluminum fluoride.

Difluoromonochloroethane was passed through the tube containing the aluminum fluoride-alumina catalyst at 200° and a contact time of 30 seconds. Gas chromatographic analysis of the reaction products showed a 18.5% conversion to 1-fluoro-1-chloroethylene. The catalyst was analyzed and 0.75% F was found.

*Example IV*

The reaction was repeated at 300° and a contact time of 30 seconds in the manner described in Example III. Gas chromatographic analysis showed a conversion of 79.5% to 1-fluoro-1-chloroethylene.

*Example V*

The reaction was repeated at 400° and a contact time of 30 seconds in the manner described in Example III. Gas chromatographic analysis of the products showed a conversion of 83.4% to 1-fluoro-1-chloroethylene.

*Example VI*

Medium grade acid-washed asbestos was soaked in a saturated solution of sodium aluminum sulfate in water. After fifteen minutes the slurry was filtered and most of the water was removed from the asbestos by washing it with acetone. The sodium aluminum sulfate coated asbestos was then soaked in a saturated solution of potassium fluoride. The slurry was filtered and dried as before.

The aluminum fluoride so formed on an asbestos support was packed in the Monel tube and heated to 500° under a flow of nitrogen. At 500° and a 30 second contact time there was a 47% conversion of difluoromonochloroethane to vinylidene fluoride. Less than 1% of 1-fluoro-1-chloroethylene was detected.

*Example VII*

Difluoromonochloroethane was passed through a Monel tube 35 cm. by 2 cm. packed with tableted ferric oxide (Girdler G–42). The tube was heated to 400° and the contact time was 30 seconds. The products were collected over water to remove hydrogen halide. Gas chromatographic analysis showed a conversion of 97.6% to vinylidene fluoride.

*Example VIII*

The reaction was repeated at 400° using a catalyst which was 4–6% nickel oxide in a thin layer on an alumina support (Girdler T–311). Gas chromatographic analysis showed a conversion of 99% to vinylidene fluoride.

*Example IX*

The reaction was repeated at 300° using activated charcoal (Barnebey-Cheney, 4 x 6 mesh, of surface area 600–700 m.²/gm.). Gas chromatographic analysis showed a conversion of 94.5% to vinylidene fluoride.

*Example X*

The reaction was repeated at 400° using zinc oxide (Harshaw ZN–0101–T 1/8). Gas chromatographic analysis showed a 96.6% conversion to vinylidene fluoride.

*Example XI*

The reaction was repeated at 300° using titania. Gas chromatographic analysis showed at 92.1% conversion to vinylidene chlorofluoride and no vinylidene fluoride.

*Example XII*

The reaction was repeated with titania at 400°. Gas chromatographic analysis showed 71.4% vinylidene fluoride and 13.4% vinylidene chlorofluoride.

*Example XIII*

The reaction was repeated at 400° using silica gel (Davison grade 70, mesh size 10). The catalyst was heated at 400° overnight so that all the absorbed water would be removed before the difluoromonochloroethane was passed over it. Gas chromatographic analysis of the product showed a 74.2% conversion to vinylidene chlorofluoride and 16.5% vinylidene fluoride.

*Example XIV*

The reaction was repeated at 200° using a catalyst which was 87.3% silica and 12.4% $Al_2O_3$ (Houdry S-90). Gas chromatographic analysis showed at 52.2% conversion to vinylidene chlorofluoride.

*Example XV*

The reaction was repeated at 300° using the silica-alumina catalyst. Gas chromatographic analysis showed a 63.2% conversion to vinylidene chlorofluoride.

*Example XVI*

The reaction was repeated at 400° using the silica-alumina catalyst. Gas chromatographic analysis showed a 76% conversion to vinylidene fluoride and no vinylidene chlorofluoride.

*Example XVII*

The reaction was repeated at 400° using a silver catalyst (Harshaw). Gas chromatographic analysis showed a 64% conversion to vinylidene fluoride.

Various alterations and modifications of the present invention will be readily apparent to those skilled in the art without departing from the scope of the present invention.

A further discussion of a process similar to the present invention may be found in application Serial No. 78,227, filed December 27, 1960.

We claim:

1. A dehydrofluorination process comprising heating a compound of the formula $CF_2ClCHRR'$, wherein R and R' are radicals selected from the group consisting of hydrogen, methyl, ethyl and propyl and wherein the sum of the carbon atoms in R and R' does not exceed four carbon atoms, to a temperature in the range of 200° C. to 500° C. in the presence of a titania catalyst.

2. The method of preparing vinylidene chlorofluoride comprising, heating 1,1,1-chlorodifluoroethane to a temperature of 200° C. to 500° C. in the presence of titania.

References Cited in the file of this patent

UNITED STATES PATENTS

| | | |
|---|---|---|
| 2,478,933 | Bratton et al. | Aug. 16, 1949 |
| 2,480,560 | Downing et al. | Aug. 30, 1949 |
| 2,599,631 | Harmon | June 10, 1952 |
| 2,803,680 | Conrad | Aug. 20, 1957 |
| 2,894,043 | Prill | July 7, 1959 |

FOREIGN PATENTS

| | | |
|---|---|---|
| 723,715 | Great Britain | Feb. 9, 1955 |